(No Model.)

2 Sheets—Sheet 1.

J. F. KESTER.
DYNAMO ELECTRIC MACHINE.

No. 397,007. Patented Jan. 29, 1889.

WITNESSES
Edwin I. Yewell
H. E. Peck.

INVENTOR.
Jesse F. Kester
per O. E. Duffy
Attorney (No Model.) 2 Sheets—Sheet 2.

J. F. KESTER.
DYNAMO ELECTRIC MACHINE.

No. 397,007. Patented Jan. 29, 1889.

WITNESSES
Edwin T. Yewell,
H. E. Peck.

INVENTOR,
Jesse F. Kester
per O. E. Duffy
Attorney.

United States Patent Office.

JESSE F. KESTER, OF TERRE HAUTE, INDIANA, ASSIGNOR OF THREE-FOURTHS TO JOSEPH H. BRIGGS, OF SAME PLACE.

DYNAMO-ELECTRIC MACHINE.

SPECIFICATION forming part of Letters Patent No. 397,007, dated January 29, 1889.

Application filed August 4, 1888. Serial No. 281,922. (No model.)

*To all whom it may concern:*

Be it known that I, JESSE F. KESTER, of Terre Haute, in the county of Vigo and State of Indiana, have invented certain new and useful Improvements in Dynamo-Electric Machines or Motors; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to dynamo-electric machines or motors, and has for its object the production of a machine which will give a high efficiency and will be thoroughly ventilated in all its parts.

The invention consists in certain novel features of construction and combinations of parts, more fully described hereinafter, and particularly pointed out in the claims.

Figure 1:
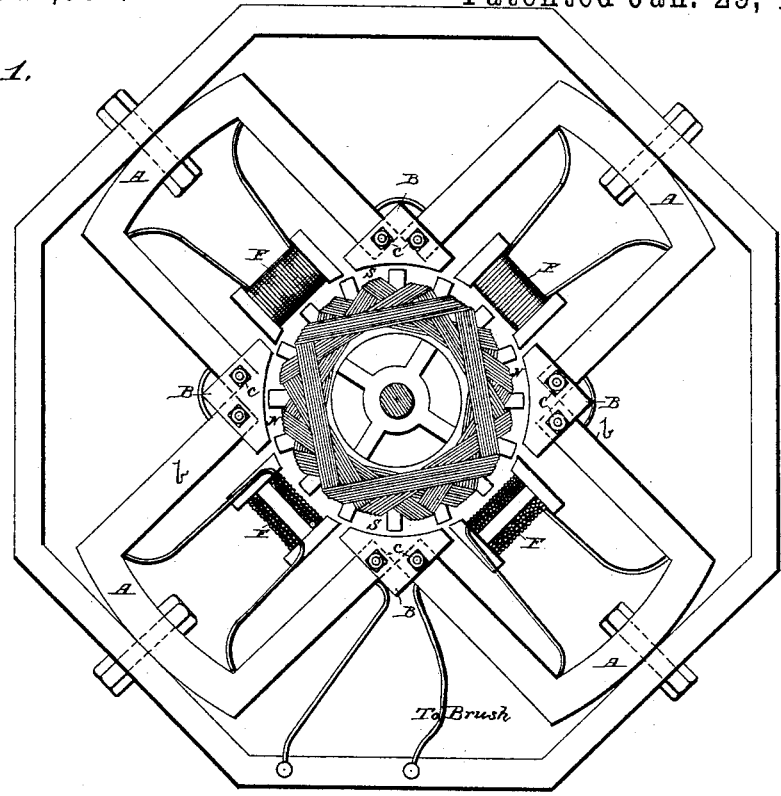
Figure 2:
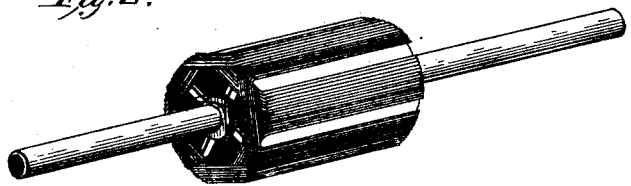
Figure 3:
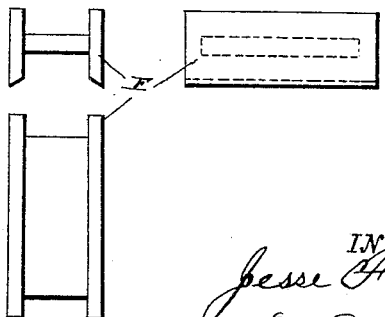
Figure 4:
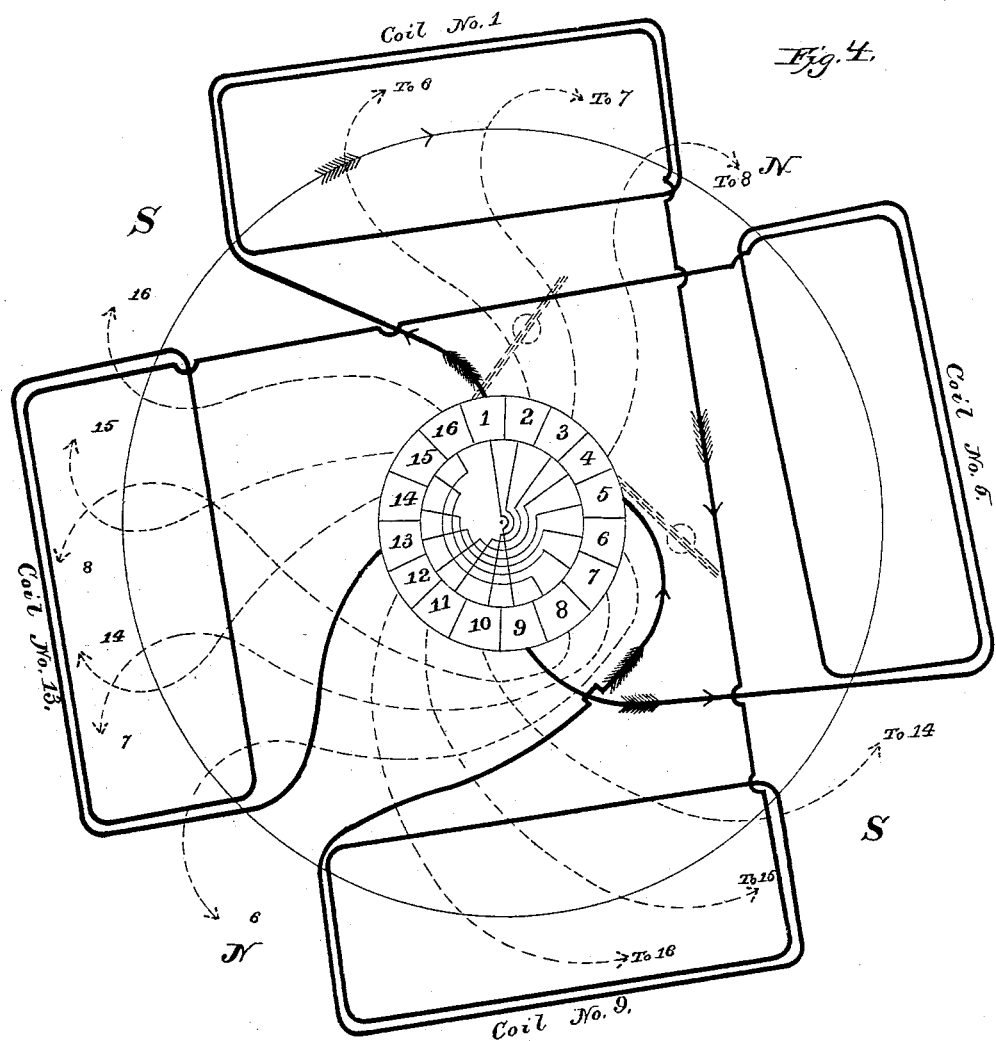

Referring to the accompanying drawings, Figure 1 is an elevation, partly in section, showing the relative positions and structure of the field-magnets and armature, the commutator not being shown. Fig. 2 is a detached detail view of a drum or cylinder armature and its shaft, showing but eight coils wound on the periphery of the armature. Fig. 3 shows three detail views of a magnetic deflector. Fig. 4 shows diagrammatically the armature-circuits.

On an exterior frame of non-magnetic material are bolted four sections of the field-magnet, A A A A. The horseshoe or U-shaped pieces *b* of the field-magnet are secured together by tie-pieces B and bolts *c*.

The entire field-magnet forms a complete magnetic path or closed circuit—that is to say, it is composed of magnetic material throughout its entire body. The coils on the horseshoe-magnets are not shown; but in practice they are connected (see connections in Fig. 1) in series, so that when a current is passed through them polar points will be established at N S N S. Some of the lines of force from these polar points will be outside of the path or orbit of the armature. In order to throw them all into the said orbit, I provide the deflectors F. (Shown in detail in Fig. 3 and in section in Fig. 1.) These are preferably H-shaped in section and of a thickness corresponding to the thickness of the field-magnets, and the limbs of the H are placed adjacent to the polar points or consequent poles of the field-magnet. The cores of the deflectors are of magnetic material, and are wound, as shown, and preferably connected in series with the field-magnet bobbins, so that the limbs of the H will be of the same polarity as the adjoining pole of the field-magnet. The lines of force, therefore, which would ordinarily be outside of the armature-orbit will be deflected inwardly to the armature.

As an incident of the structure thus far described, the lines of force, if visible, would follow arc-shaped paths with the convex side of the arcs to the axis of the armature, the arcs meeting at the polar points N S N S. The coils of the armature may thus be made to cut all of the lines of force.

The armature is of the drum or cylinder type, composed of a tubular core of iron mounted on a central spindle carrying the commutator. The coils of the armature are laid on the periphery of the core, as shown in Figs. 1 or 2.

The type of machine illustrated is provided with sixteen commutator-strips. The armature is wound with sixteen coils, the layers of each coil extending longitudinally of the drum or ring on the outer surface of the armature, and at the ends being carried across on a line forming a chord of the periphery of the armature. This method of winding leaves the central portion of the armature open and provides a free passage for air, keeping the parts cool when the machine is in operation. It also facilitates repairs by enabling a workman to have ready access to its coils, so as to distinguish and remove and replace the windings if from any cause they should be damaged. The circuits in the armature are arranged as shown in Fig. 4. In the present construction only four coils are in circuit at any one moment, and but two brushes are used. Opposite coils of the armature are connected together and their free ends connected to different commutator-strips. There are as many coils as there are commutator-strips; but to avoid confusion but four have been shown in Fig. 4, the terminals of the others simply being indicated.

Coil No. 1, at the top of the diagram, has its free end connected to commutator-strip No. 1. This coil is connected with a coil on the opposite side of the drum, the free end of which is connected with commutator-strip No. 5. In the same way coil No. 2 is in circuit with a coil diametrically opposite and terminating in commutator-strip No. 6. Coil No. 3 in the same way reaches strip No. 7, and coil No. 4, strip No. 8. The coils thus far traced are all laid in the same direction, and each covers about ninety degrees in the circumference of the armature. The coils occupying the next quadrant are oppositely wound. Passing around the armature-ring the opposite coils terminate in commutator-strips 9 and 13, 10 and 14, 11 and 15, 12 and 16. The brushes are placed so as to bear on strips of the commutator, having three intervening strips. With the connections thus far described but two coils would be developing current.

By a simple system of connections I throw four coils into circuit. Obviously this might be done by providing an additional pair of brushes. I prefer, however, to use connecting-wires or conductors between opposite commutator-strips. Strip No. 1 is electrically connected by a wire through the hollow commutator with strip No. 9, 2 with 10, 3 with 11, 4 with 12, 5 with 13, 6 with 14, 7 with 15, &c. Supposing, therefore, the armature to be in a phase in which strip No. 1 rests under brush, Fig. 4, the current will proceed through the coils indicated in full lines to strip 5; but by the internal connections of the commutator it will be seen that the pairs of coils which are removed ninety degrees from the ones just noted also terminate in strips Nos. 1 and 5. These two pairs of coils are therefore connected in multiple arc with the brushes, so when any other strip comes under brush there will be two pairs of coils in the armature which discharge in multiple arc into the brushes. It will be seen on inspection of the diagram, Fig. 4, that the pairs of coils which are ninety degrees apart approximately cover the whole circumference of the armature—that is to say, each coil covers a segment of about ninety degrees of a circle. By reason of the opposite direction of winding of adjoining pairs of coils which are in circuit the currents set up are in the same direction, although one may be approaching and the other receding from a polar point of the field, so that the whole four coils develop current in the same direction.

The field-magnets are placed in series relative to the armature, so that the direction of current in the external circuit remains constant as the adjacent coils sweep past the successive polar points.

It is evident that various slight changes might be resorted to in the form and arrangement of the parts described without departing from the spirit and scope of my invention; hence I do not wish to limit myself strictly to the precise construction herein set forth, but consider myself entitled to all such changes.

What I claim is—

1. In a dynamo-electric machine or motor, the combination, with a field-magnet, of a magnetic deflector located between the field-magnet poles, said deflector having polar extremities adjacent to the field-magnet poles similarly polarized, whereby substantially all the lines of force are thrown into the armature-orbit.

2. In a dynamo-electric machine or motor, the combination, with a field-magnet and an armature, of a magnetic deflector, whereby substantially all the lines of force are thrown into the armature-orbit.

3. In a dynamo-electric machine or motor, the combination, with a field-magnet, of a magnetic deflector located between the field-magnet poles and coils on the field-magnet and on the deflector wound and connected in series.

4. In a dynamo-electric machine or motor, the combination of the field-magnet, magnetic deflectors, an armature, opposite coils in said armature connected and terminating in commutator-strips ninety degrees apart, the coils opposite adjacent field-magnet poles being oppositely wound, respectively, and brushes spaced to correspond to the terminal commutator-strips.

5. In a dynamo-electric machine or motor, a drum or cylinder armature having its coils longitudinally wound on its outer surface and carried transversely across its ends to form chords of the outer periphery of the armature, said coils being arranged in sets, each set covering approximately the whole circumference of the armature, and the coils of each set being located an equal distance apart, a commutator having a number of strips equal to the number of armature-coils, coils of the same polarity in each set being electrically connected and terminating in commutator-strips, electrical connections between commutator-strips of the same polarity, and a pair of commutator-brushes, substantially as described.

6. In a dynamo or motor, the combination, with a field-magnet, of an armature, a series of coils arranged flat on the circumference of the same in successive sets, the coils being located an equal distance apart and adjacent coils being wound in opposite directions and each set covering approximately the whole circumference of the armature, a series of commutator-strips equal in number to the armature-coils, the coils in the same set and of the same polarity being electrically connected and terminating in commutator-strips, and the terminal commutator-strips of the same polarity and belonging to the same set being electrically connected, and a pair of commutator-brushes spaced to correspond to said terminal strips, substantially in the manner and for the purpose described.

7. In a dynamo or motor, the combination, with the field-magnet, of an armature having a series of coils arranged flat on the circumference in successive sets of four located ninety degrees apart and each set approximately covering the whole circumference of the armature, a series of commutator-strips corresponding to the series of armature-coils, the successive pairs of coils on opposite sides of the armature and in each set being electrically connected and terminating in commutator-strips located ninety degrees apart, the diametrically-opposite commutator-strips being electrically connected, and brushes set ninety degrees apart, whereby the coils in one set may be thrown into the generating-circuit and the remaining coils shut out of the circuit.

In testimony that I claim the foregoing as my own I affix my signature in presence of two witnesses.

JESSE F. KESTER.

Witnesses:
HUBERT EUGENE PECK,
CHAS. M. WERLE.